United States Patent [19]
Tailliet

[11] Patent Number: 5,821,639
[45] Date of Patent: Oct. 13, 1998

[54] HIGH VOLTAGE GENERATOR WITH OSCILLATOR SERVO-LINKED TO LOW SUPPLY VOLTAGE

[75] Inventor: François Pierre Tailliet, Epinay sur Seine, France

[73] Assignee: SGS-Thomson Microelectronics S.A., Saint Genis, France

[21] Appl. No.: 665,279

[22] Filed: Jun. 17, 1996

[30]     Foreign Application Priority Data

Jun. 21, 1995  [FR]  France ................................. 95 07617

[51] Int. Cl.⁶ ................................................. H03K 21/00
[52] U.S. Cl. ............................................ 307/109; 327/44
[58] Field of Search ................................... 307/109, 110; 320/1; 323/218, 233, 293, 364; 363/59, 60; 327/99, 40–46

[56]          References Cited

U.S. PATENT DOCUMENTS 5,499,183   3/1996   Kobatake ................................. 363/59
5,592,129   1/1997   Fried et al. ............................. 327/42

FOREIGN PATENT DOCUMENTS

A-0 591 022   4/1994   European Pat. Off. .
WO-A-95 00953   1/1995   WIPO .

*Primary Examiner*—Richard T. Elms
*Attorney, Agent, or Firm*—Wolf, Greenfield & Sacks, P.C.; James H. Morris

[57]          ABSTRACT

Disclosed is a high voltage generator circuit of the charge pump type. The rate of operation of this pump is set by a sequence of piloting signals produced out of a clock signal. This clock signal is itself produced by an oscillator. A frequency servo-link is set up between the clock signal produced by the oscillator and the running of the sequence in order to produce a clock signal with a frequency that is equal to the maximum permissible frequency for low supply voltages while at the same time limiting this frequency from a given supply voltage threshold onwards.

8 Claims, 4 Drawing Sheets

HIGH VOLTAGE GENERATOR WITH OSCILLATOR SERVO-LINKED TO LOW SUPPLY VOLTAGE

BACKGROUND OF THE INVENTION

1. Field of the Invention

The invention relates to the electronic circuits that are supplied by a voltage and in which it is necessary to produce a voltage that is higher than their supply voltage.

2. Discussion of the Related Art

A typical example is the case of integrated circuits incorporating non-volatile memories that use floating-gate transistors: the programming of these memories requires a programming voltage far higher than the normal supply voltage. In order that the user may be able to use his memory with a single external supply voltage, it is planned that the integrated circuit will possess internal means to produce the programming voltage out of the supply voltage. The circuit that will produce the programming voltage is a voltage boosting circuit whose principle is generally based on that of the "charge pump".

The diagram showing the principle of the charge pump is given in FIG. 1. The charge pump includes a sequence of stages of diodes and capacitors, with switches to switch over the connections of the capacitors between a supply voltage Vcc and a ground according to two periodic piloting signals (also called phases) FN, FX that are not overlapping. Each stage has two capacitors C, C' and two diodes D, D'. In a first phase FN, the first capacitor C is charged at the supply voltage Vcc. In a second phase FX, it is discharged partially into the second capacitor. Then it is charged again. The diodes prevent the discharging of the second capacitor into the first one so that gradually the voltage at the terminals of the second capacitor will increase up to a value that may in theory reach 3 * Vcc (if voltage drops in the diodes are not taken into account). To obtain a higher voltage, n successive stages are cascade-connected. Taking account of the threshold voltage Vd of the diodes, the voltage obtained may be (n+1) * (Vcc–Vd).

To obtain a value of output voltage that is sufficient without excessively increasing the number of stages, it has already been proposed to limit the losses by replacing the diodes D and D' with transistors T, T' that do not create any voltage drop at their terminals when they are conductive. The diagram that may result therefrom is that of FIG. 2. Since the transistors also have a threshold voltage Vt, it is provided that certain transistors will have their control gate controlled by a voltage level greater than at least the level Vt of the voltage that they should let through. Thus, with n charge pump stages, there is then obtained an output voltage that may reach (n+1) * Vcc, which is more favorable than in the diode circuits.

In practice, the charge pump diagram of FIG. 2 shows two pairs of piloting signals or phases: FN and FX on the one hand as in FIG. 1, switching between two voltage levels 0 and Vcc; FBN and FBX on the other hand, respectively synchronized with FN and FX but switching between two voltage levels 0 and Vb where Vb is the highest possible voltage level (that will depend on the number of stages, and more specifically on the maximum voltage to be put through the transistors). Care will be taken however to limit the value of Vb so as not to disrupt the gate oxides of the transistors.

The European patent application EP-A-0 591 022 describes a charge pump of this kind. When a charge pump is used, it is always worthwhile for the voltage produced to reach the desired value as quickly as possible. In other words, it will be worthwhile to produce phases having the highest possible frequency since it is the frequency of the phases that will condition the build-up time of the pump.

Furthermore, it will be worthwhile to ensure that there is stability of the sequencing of the phases. In one approach, the element used is an oscillator in ring form, namely a self-oscillating circuit that produces a stable oscillation frequency.

One problem with this type of circuit is that the oscillation frequency is directly a function of the value of the supply voltage. Indeed, the production of the phases is typically achieved by means of logic gates whose switch-over time is a function of their supply voltage. Now, there is now an increasing trend towards the designing of circuits that can be used with a supply voltage within a certain range, for example, between 2.0 and 5.0 volts, and no longer with a given supply voltage. To the minimum supply voltage there will correspond the lowest frequency of the pump. To the maximum supply voltage there will correspond the highest frequency. It is difficult to achieve a compromise that gives a minimum frequency of considerable value and at the same time prevents the maximum frequency from being excessively high and prevents the circuit from having, for example, problems of electromagnetic radiation.

In one approach, an external clock signal with a stable frequency is used to produce the phases which are independent of the variations in supply voltage. In this case, problems of radiation, if any, will be avoided, but it will be necessary to set the frequency as a function of the minimum supply voltage. Indeed, the minimum supply voltage corresponds to the slowest sequencing of the phases. If the frequency of the external oscillator is faster than the limit that is permissible in order that the phases may be properly sequenced, then the system will "stall", that is it will get desynchronized and get turned off. The build-up time of the pump will therefore be limited for higher supply voltages which will enable working at a higher frequency of sequencing of the phases.

One aim of the invention therefore is to provide for a charge pump circuit that is improved from this viewpoint, namely a charge pump circuit that makes it possible not to limit the sequencing frequency of the phases to its maximum permissible value for a minimum supply voltage, while limiting this frequency on the basis of a given threshold value of supply voltage.

SUMMARY OF THE INVENTION

The invention proposes a charge pump that comprises two modes of operation. For low supply voltages, the frequency increases with the supply voltage. In other words, it is the speed proper of the sequencing of the phases that conditions the frequency of the pump. On the basis of a given threshold of supply voltage, the frequency is limited to a given value. In other words, the frequency of the pump is then independent of the supply voltage. It is then the frequency of a relaxation oscillator itself that conditions the sequencing of the phases.

Thus, the invention relates to a charge pump type of high voltage generator circuit, comprising a set of capacitors and transistors and a control circuit for switching-over of the transistors for repetitive production of piloting signals out of a clock signal produced by an oscillator, wherein said oscillator comprises command means of a clock signal frequency to command the clock signal frequency to be equal to the smallest frequency of a first frequency which is fixed and a second frequency which is dependent on the piloting signals.

And, the invention relates to a method for generating a clock signal for a charge pump type of high voltage generator circuit, comprising a set of capacitors and transistors and a control circuit for switch-over of the transistors for repetitive production of piloting signals out of the said clock signal produced by an oscillator, wherein a frequency of the clock signal is the smallest of a first frequency which is fixed and a second frequency which is dependent on the piloting signals.

BRIEF DESCRIPTION OF THE DRAWINGS

Other characteristics and advantages of the invention shall appear from the following detailed description made with reference to the appended drawings, of which.

DETAILED DESCRIPTION

Figure 5:
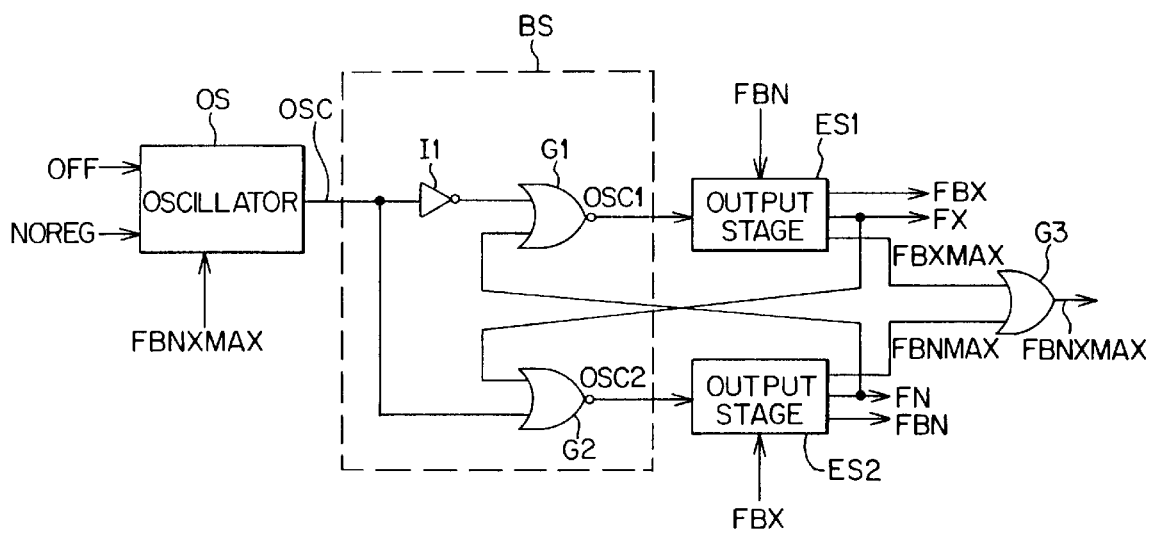
FIG. 5 shows a switch-over control circuit according to the invention.

FIG. 5 shows the general constitution of a switch-over control circuit used in a high voltage generator of the charge pump type made according to the invention.

Figure 1:
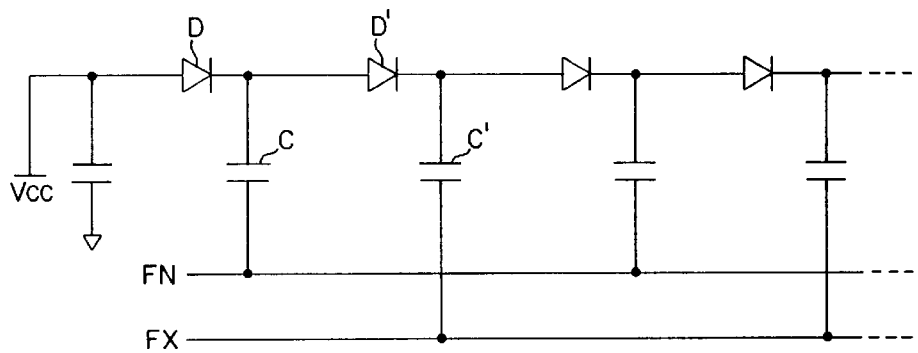
FIG. 1 shows a charge pump with diodes and capacitors.
Figure 2:
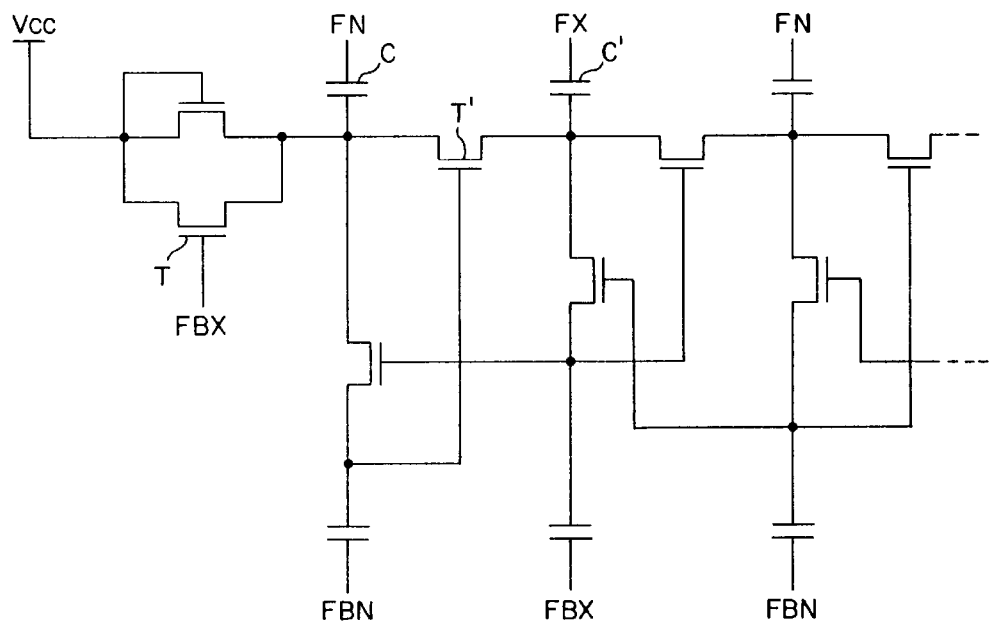
FIG. 2 shows a charge pump with transistors and capacitors.
Figure 3:
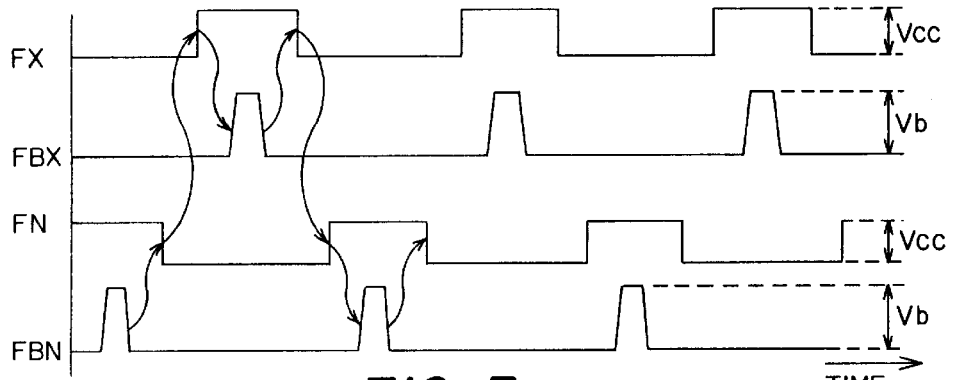
FIG. 3 shows the phases associated with a charge pump of FIG. 2.

The charge pump is a pump of the kind shown in FIG. 2, namely it has several cascade-connected stages comprising transistors and capacitors and a switch-over control circuit producing four switch-over phases FN, FBN, FX, FBX (shown in FIG. 3). Of these, FN and FX are two phases that are complementary but not overlapping in the high state, switching between two values that are substantially 0 and Vcc (Vcc being the supply voltage of the circuit) and FBN and FBX are phases synchronized with FN and FX respectively and switching between two voltage values that are substantially 0 and Vb with Vb greater than at least Vt (Vt being the threshold voltage, given the substrate effect, of the transistors controlled by the phases FBN and FBX) at the voltage that the transistors must let through, Vt being in the range of 3 to 4 volts. It will be said that FN and FX are non-bootstrapped signals, FBN and FBX being bootstrapped signals so as to be capable of exceeding at least the value of Vt, namely the voltage that the transistors must let through. It may be recalled that the term "boot-strapping" refers to a technique for the production of a signal that is artificially raised with respect to its normal value, generally by means of a capacitor that is precharged before being interposed in series between the signal to be raised and the terminal at which the raised signal must appear.

It is possible to make the invention in integrated circuit form by means of CMOS technology.

The switch-over control circuit of FIG. 5 produces four phases FN, FBN, FX and FBX. It comprises an oscillator OS giving a periodic signal OSC at a frequency F, a phase separation circuit BS for the production, from the signal OSC, of two complementary signals at the frequency F that are not overlapping in the high state and finally two output stages ES1 and ES2 using these signals to produce the signals FN and FBN (stage ES2) and the signals FX and FBX (stage ES1).

Figure 4:
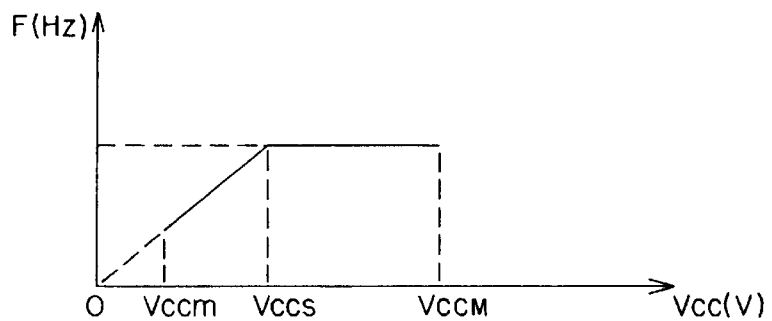
FIG. 4 shows the changes undergone by the operating frequency of the charge pump according to the invention, as a function of the supply voltage.

The frequency F will vary as a function of the supply voltage Vcc as shown in FIG. 4. It will be assumed that the supply voltage Vcc may vary between a minimum value Vccm and a maximum value VccM. For Vcc ranging between Vccm and a value Vccs below VccM, the frequency F increases with the voltage Vcc. Between Vccs and VccM, the frequency F will be substantially stable.

The phase separation circuit BS receives the signal OSC. It has an inverter I1 to invert the signal OSC. This inverted signal is given to an input of a NOR logic gate G1, the other input of which receives the phase FN. The gate G1 produces a logic signal OSC1 that is given to the output stage ES1. The signal OSC1 is used, as shall be seen, by the output stage ES1 to produce the phases FX and FBX, and a logic signal FBXMAX. The output stages ES1 and ES2 respectively also output signal FBN and signal FBX, as shall be seen hereinafter in the description.

The phase separation circuit BS comprises a second NOR logic gate G2 receiving, at a first input, the signal OSC and, at another input, the phase FX. The gate G2 produces a logic signal OSC2 that is given to the output stage ES2. This signal OSC2 is used, as shall be seen, by the stage ES2 to produce the phases FN and FBN and a logic signal FBNMAX.

The two logic signals FBXMAX and FBNMAX are provided to the input of an OR logic gate G3. The output signal of the gate G3, referenced FBNXMAX, is provided to the oscillator OS. Finally, the oscillator OS receives two control logic signals, OFF and NOREG.

Figure 6:
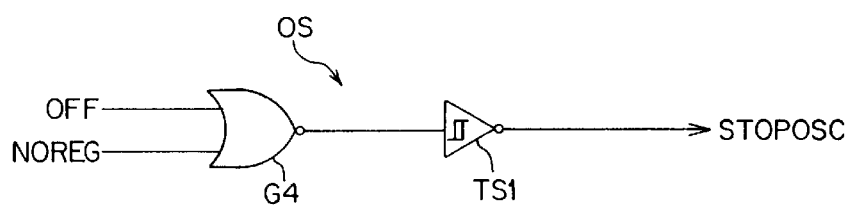
FIG. 6 shows a diagram of a control circuit of an oscillator.

The oscillator OS preferably has a control circuit shown in FIG. 6.

The signal OFF is a control signal enabling the oscillator to be turned on (OFF=0) or to be turned off (OFF=1).

The signal NOREG is a signal coming from a regulator enabling the oscillator OS to be stopped when the voltage produced by the pump reaches the desired value. A regulator is used to make the voltage produced independent of the value of the supply voltage Vcc. It is thus possible to achieve the cascade connection of a number of stages sufficient to produce the desired voltage when the supply voltage is the minimum, and the pump is stopped when a regulation circuit ascertains that the desired value is reached (this happens with a speed that varies according to the value of Vcc). If the output voltage diminishes, the regulation circuit puts the pump back into operation. Circuits of this kind are standard ones and shall not be described herein. It will be assumed that the signal NOREG is used to turn the oscillator on if NOREG=0 or to stop it if NOREG=1. Of course, it is possible to lay down additional conditions for turning the oscillator on or turning it off. It is even possible to make a pump that never stops if the signal OFF is set at 0.

The control circuit shown in FIG. 6 produces a control logic signal STOPOSC from the signals OFF and NOREG. This control logic signal STOPOSC is used to turn the oscillator OSC on or to turn it off.

The control circuit has, for this purpose, a NOR logic gate G4 and a hysteresis inverter TS1 (Schmitt trigger). The logic gate G4 receives the two signals OFF and NOREG and its output corresponds to the input of the inverter TS1. The output of the hysteresis inverter TS1 produces the signal STOPOSC.

As shall be seen hereinafter, the signal will stop the oscillator if STOPOSC=1 and will turn it on if STOPOSC=0.

Figure 7:
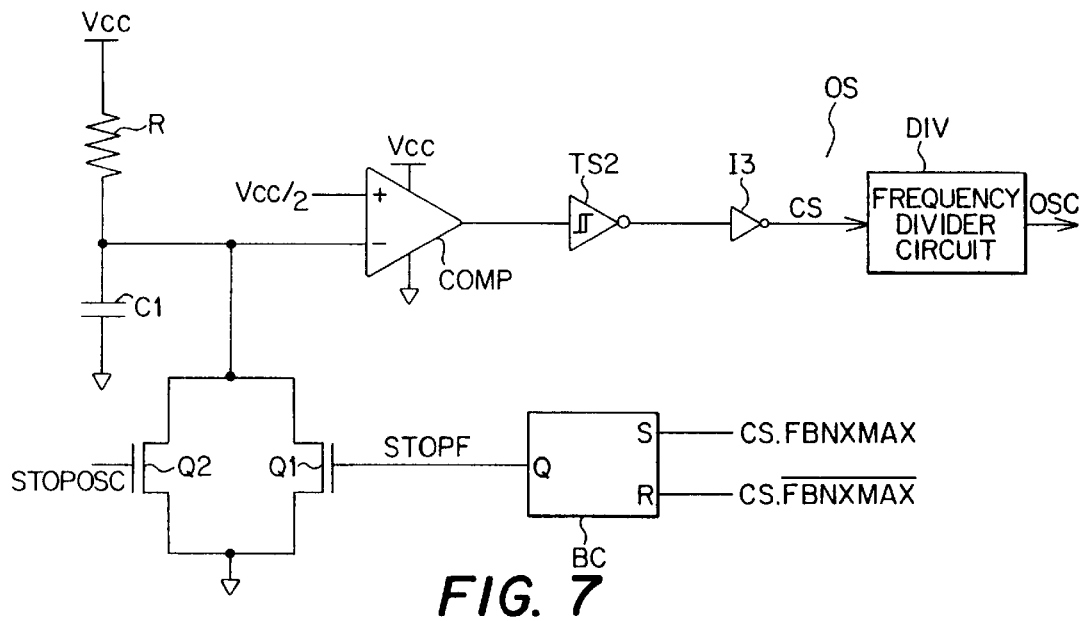
FIG. 7 shows a diagram of an oscillator.

FIG. 7 shows the oscillator OS proper.

This relaxation oscillator preferably has an oscillating circuit to produce a basic oscillating signal. In the example shown in FIG. 7, it is an R-C type circuit comprising a resistor R and capacitor C1 series-connected between the supply Vcc and the ground. The resistor R has a first pole connected to Vcc and its second pole is connected to a first pole of the capacitor C1. The capacitor C1 has its second pole connected to the ground. By using an R-C circuit, there is produced a frequency that is stable as a function of the supply voltage, the time constant R * C1 being independent of the value of the supply voltage Vcc.

In parallel with the capacitor C1, two N type transistors Q1 and Q2 are mounted. These transistors Q1 and Q2 have their drains connected to the first pole of the capacitor C1 and their sources connected to the ground, and their control gates respectively receive a logic signal STOPF and the signal STOPOSC. When the signal STOPOSC is in the logic state 1, the second pole of the resistor R is connected directly to the ground which, as shall be seen, holds the signal OSC in a permanent state (in other words with a zero frequency). It is thus possible to slow down the frequency of the clock signal.

The first pole of the capacitor C1 is connected to an input of a comparator COMP which compares the voltage at the terminals of the capacitor C1 to the voltage Vcc/2. The output of this comparator is connected to the input of a hysteresis inverter TS2. The output of this inverter TS2 is connected to the input of an inverter I3 whose output produces a logic signal CS of the positive pulse type.

From the signals CS and FBNXMAX, there is produced the signal STOPF by means of an RS flip-flop circuit referenced BC, receiving the logic signal CS.FBNXMAX at the input S and the logic signal /CS./FBNXMAX at the input R. The signal STOPF enables the frequency of the clock signal to be slowed down. Indeed, the signal STOPF goes to the logic state 1 only if the voltage at the terminals of the capacitor C1 has reached Vcc/2 and if the signal FBNXMAX is at 1 (which corresponds, as shall be seen hereinafter, to the fact that the signals FBX or FBN have reached their maximum value). Thus, the capacitor C1 is not discharged so long as the signals FBX or FBN have not reached their maximum value.

When the voltage at the terminals of the capacitor C1 reaches Vcc/2, the comparator COMP connects the first pole of the capacitor C1 to the ground by means of the hysteresis inverter TS2 and the inverter I3, when the signal FBNXMAX goes to 1. For, the output of the comparator COMP goes to the high state. The output of the hysteresis inverter TS2 then goes to the low state. The output of the inverter I3 then goes to the high state, turning the transistor Q1 on (we then have STOPF=1), when the signal FBNXMAX goes to 1. The presence of the hysteresis inverter TS2 provides for the complete discharge of the capacitor C1 before the transistor Q1 is cut off.

The voltage at the terminals of the capacitor has a saw-toothed shape between 0 and Vcc/2 (if STOPOSC=0). If STOPOSC=1, the signal CS will be held in the low state.

Figure 9A:
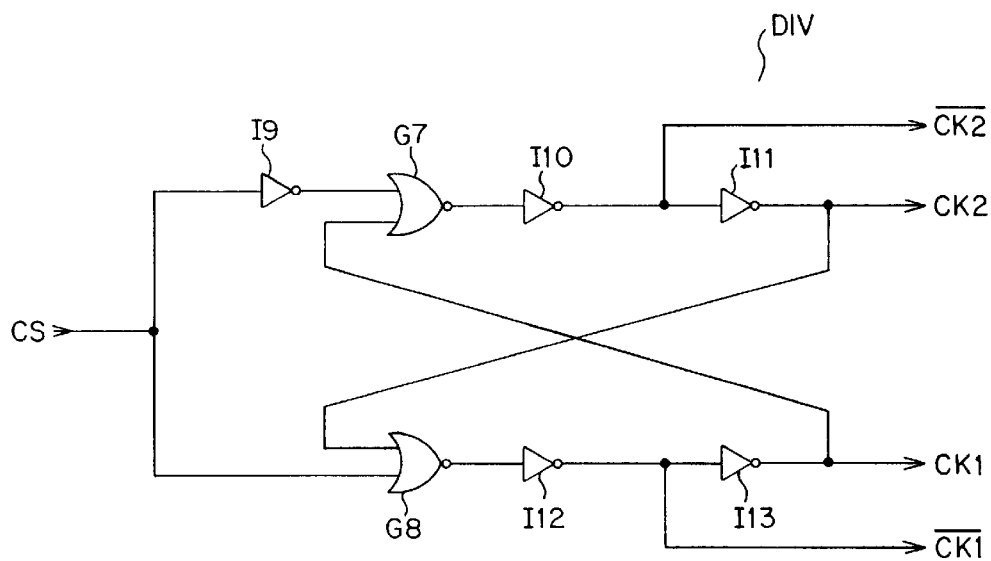
Figure 9B:
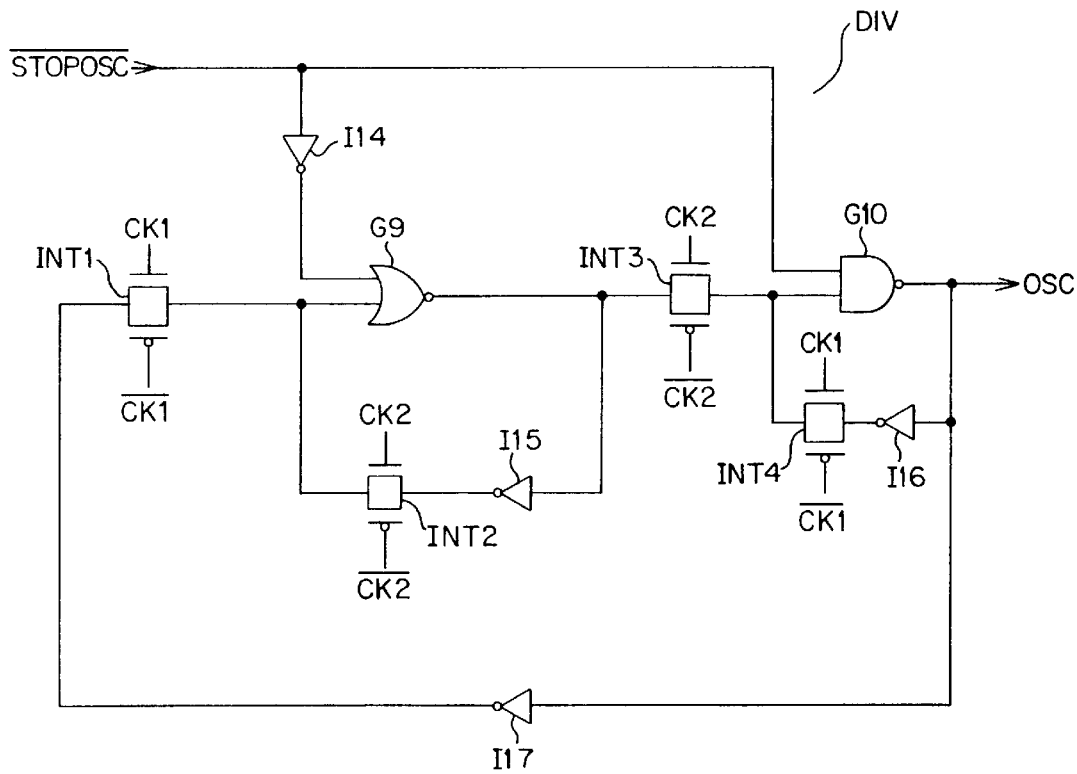

This logic signal CS is given to a circuit DIV shown in FIGS. 9a and 9b. This circuit also receives the signal STOPOSC and produces the signal OSC out of these signals. Since the signal CS takes the form of pulses, a divider circuit is associated with the pulse generator formed by the assembly including of the comparator COMP and the hysteresis inverter TS2. This is done in order to obtain a clock signal OSC with a cyclical ratio of ½ from the repetitive charging and discharging of the capacitor C1.

The circuit DIV is preferably made according to FIGS. 9a and 9b.

It has a clock signal generating circuit shown in FIG. 9 and a master-slave flip-flop circuit shown in FIG. 9b.

The clock signal generating circuit shown in FIG. 9a enables the production of the clock signals CK1, /CK1, CK2, /CK2 out of the signal CS. This circuit receives the signal CS at input. This signal is inputted by an inverter I9. This inverter has its output connected to a first input of a NOR logic gate G7. The second input of this gate G7 receives the signal CK1. The output of the gate G7 is connected to the input of an inverter I10. The output of this inverter I10 produces the signal /CK2 which is inverted by an inverter I11 that produces the signal CK2.

The circuit shown in FIG. 9a also has a NOR logic gate G8 receiving the signal CS at a first input and the signal CK2 at its second input. The output of this logic gate G8 is connected to the input of an inverter I12. The output of this inverter I12 produces the signal /CK1 that is inverted in an inverter I13 to produce the signal CK1.

The master-slave flip-flop circuit shown in FIG. 9b receives, firstly, the signals produced by the circuit shown in FIG. 9a and secondly the signal /STOPOSC.

The signal /STOPOSC is inverted in an inverter I14.

The master stage of the flip-flop has a NOR logic gate G9 and an inverter I15 mounted in a negative feedback connection between the output of the gate G9 and one of its inputs. More specifically, the gate G9 receives the signal STOPOSC at one input. The output of this gate is connected to the input of the inverter I15. The output of the inverter I15 is connected to the second input of the gate G9 by means of a MOS switch INT2 controlled by the signals CK2 (the N transistor of the switch) and /CK2 (the P transistor of the switch).

The slave stage of the flip-flop circuit has a NAND logic gate G10 and an inverter I16 mounted in a negative feedback connection between the output of the gate G10 and one of its inputs. More specifically, the gate G10 receives the signal STOPOSC at one input. The output of this gate is connected to the input of the inverter I16. The output of the inverter I16 is connected to the second input of the gate G10 by means of a MOS switch INT4 controlled by the signals CK1 (the N transistor of the switch) and /CK1 (the P transistor of the switch). The output of the gate G10 produces the signal OSC.

This signal OSC is inverted in an inverter I17. The output of this inverter I17 is connected to the second input of the gate G9 by means of a MOS switch INT1 controlled by the signals CK1 (the N transistor of the switch) and /CK1 (the P transistor of the switch).

Finally, the output of the gate G9 is connected to the second input of the gate G10 by means of a MOS switch INT3 controlled by the signal CK2 (the N transistor of the switch) and /CK2 (the P transistor of the switch).

The production of the clock signal OSC having been described, the production of the phases shall now be examined.

Figure 8:
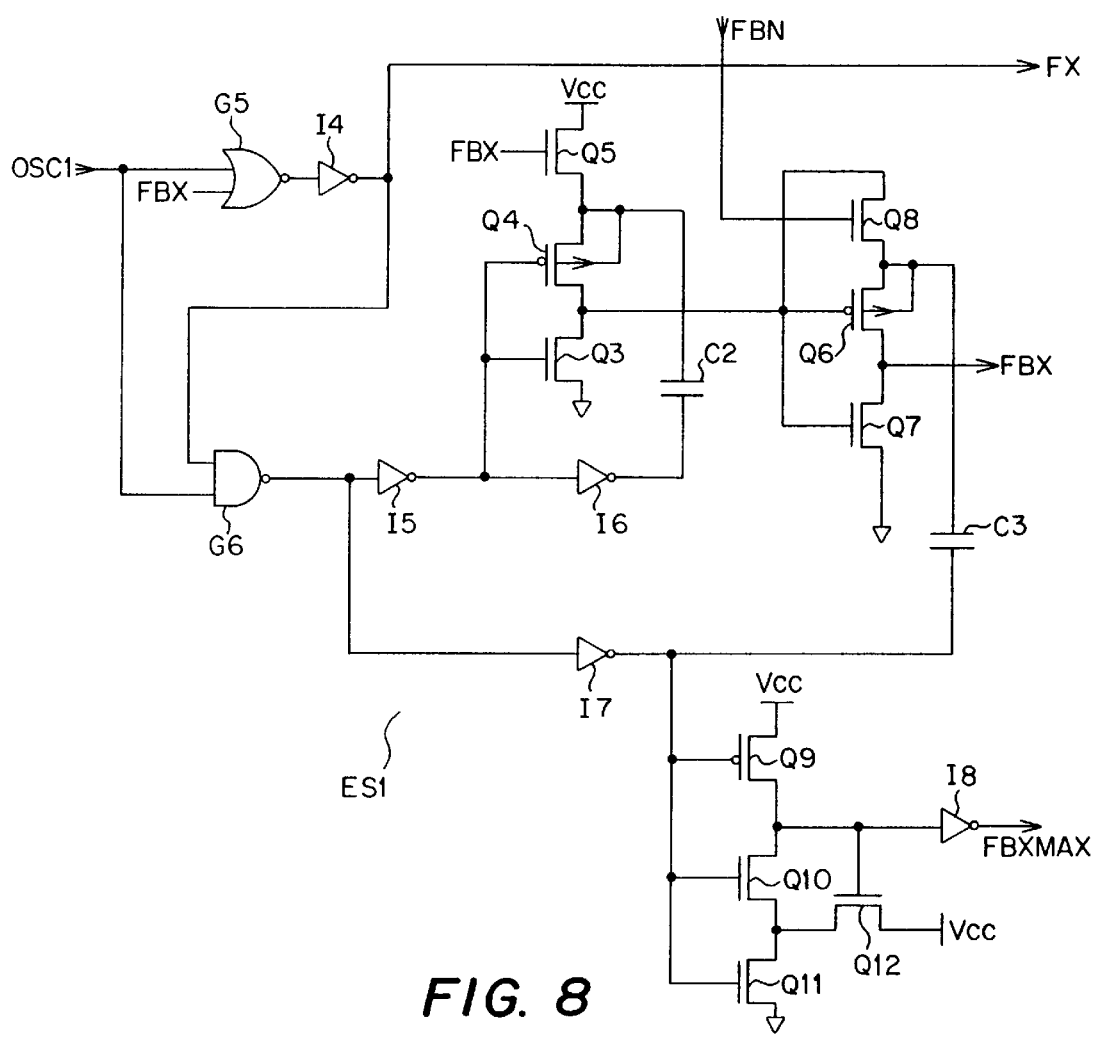
FIG. 8 shows a diagram of an output circuit to produce the phases of FIG. 3, FIGS. 9$a$ and 9$b$ show diagrams of a frequency divider.

The circuits ES1 and ES2 are preferably made according to FIG. 8. Since they are made similarly, only the stage ES1 shall be described.

The stage ES1 receives the signals OSC1 and FBN and, from these signals, produces the signals FX, FBX and FBXMAX.

The rising of FX prompts the rising of FBX and the descent of FBX prompts the descent of FX.

The stage ES1 has a NOR logic gate G5 and a NAND logic gate G6.

The logic gate G5 receives the signal OSC1 at one input. Its other input receives the signal FBX. Its output is connected to the input of an inverter I4 that plays the role of a buffer circuit (namely it is capable of providing large currents). The output of the inverter I4 produces the signal FX which oscillates between 0 and Vcc.

The logic gate G6 receives the signal OSC1 at one input. It receives the signal FX at its other input.

The output of the gate G6 is connected to the input of an inverter I5 and to the input of an inverter I7. The output of the inverter I5 is connected to the control gates of an N type transistor Q3 and a P type transistor Q4. The source of the transistor Q4 is connected to the source of a P type transistor Q5. The source of this transistor Q5 receives Vcc. Its control gate receives the signal FBX. The drain of the transistor Q4 is connected to the drain of the transistor Q3 whose source is connected to the ground. The output of the inverter I5 is also connected to the input of an inverter I6. The output of this inverter I6 is connected to the source of the transistor Q4 by means of a capacitor C2. The transistors Q3 and Q4 form an inverter enabling the supply of a voltage that has the potential of the ground, or equal to 2 * Vcc. The transistors Q5 and the capacitor C2 enable the production, out of Vcc, of a voltage that is bootstrapped and equal to 2 * Vcc.

The drain of the transistor Q3 is connected to the control gates of a P type transistor Q6 and an N type transistor Q7 and to the drain of an N type transistor Q8. The source of the transistor Q8 is connected to the source of the transistor Q6. The drain of the transistor Q6 is connected to the drain of the transistor Q7. The transistor Q7 has its source connected to the ground. Finally, the control gate of the transistor Q8 receives the signal FBN. The output of the inverter I7 is connected to the source of the transistor Q6 by a capacitor C3. The transistors Q6 and Q7 form an inverter enabling the supply of a voltage that has the potential of the ground, or equal to 3 * Vcc. The transistors Q8 and the capacitor C3 enable the production, out of 2 * Vcc, of a voltage that is bootstrapped and equal to 3 * Vcc.

The signal at the drain of the transistor Q7 corresponds to the signal FBX which oscillates therefore between 0 volts and 3 * Vcc.

The output of the inverter I7 is also connected to the input of an inverter I8 by means of a Schmitt half-trigger, the output of the inverter I7 corresponding to the input of this half-trigger.

The half-trigger comprises:

a P type transistor Q9 whose source receives Vcc and whose control gate is connected to the input of the half-trigger, a first N type transistor Q10 having its drain is connected to the drain of the P type transistor Q9 and its control gate is connected to the input of the half-trigger, a second N type transistor Q11 having its drain connected to the source of the first N type transistor Q10, its control gate connected to the input of the half-trigger and its source connected to the ground, a third N type transistor Q12 with its drain receiving Vcc, its source connected to the source of the first N type transistor Q10 and its control gate connected to the drain of this same N type transistor.

The output of the half-trigger corresponds to the midpoint of the P type transistor Q9 and of the first N type transistor Q10. This output is connected to the input of the inverter I8 and the output of this inverter produces the signal FBXMAX in such a way that FBXMAX goes to the high state if FBX reaches its maximum value, namely when the signal at output of the inverter I7 reaches its maximum. Thus, the production of the signal FBXMAX takes into account both the rise of FBX (the recurrence frequency of which depends on the frequency of OSC) and its amplitude (which varies as a function of Vcc).

The output of the divider DIV supplies the circuit BS, and therefore the output stages ES1 and ES2. For a low value of Vcc, the signal OSC is servo-linked to the efficient progress of the phases by means of a half-comparator of each output stage. The output stages ES1 and ES2 do not permit the production of the pulses, unless the phases FBX and FBN have reached their maximum, by means of the signal STOPF. Thus, for Vcc<Vccs, the appearance of trailing edges in the clock signal OSC is conditioned by the fact that FBX has reached its maximum, and the appearance of leading edges is conditioned by the fact that FBN has reached its maximum. Through the validation of the operation of the oscillator as a function of the phases, it is thus seen to it that there is operation at optimum frequency of the charge pump when Vcc<Vccs, the frequency being fixed and determined by the values of R and C1 when Vcc>Vccs.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A switch-over control circuit for a charge pump type of high voltage generator circuit having a set of capacitors and transistors, the switch-over control circuit charging the charge pump by selectively switching the connections between the capacitors and the transistors by issuing piloting signals, the switch-over circuit comprising:

an oscillator for producing a clock signal;

piloting means for receiving the clock signal and producing the piloting signals; and command means directing the oscillator to produce the clock signal at a frequency equal to a smallest frequency of a first frequency which is fixed and a second frequency which is dependent on the piloting signals.

2. A circuit according to claim 1, wherein the piloting means comprise:

a phase separation circuit for production, from the clock signal, derived clock signals; and output stages to produce the piloting signals as a function of the derived clock signals.

3. A circuit according to claim 2, wherein the output stages comprise means to produce the control signal, a logic state of which represents an amplitude of the piloting signals produced, and wherein the control circuit comprises means to check the frequency of the clock signal produced by the oscillator as a function of a state of the control signal.

4. A circuit according to claim 3, wherein the oscillator comprises a capacitor, the capacitor being respectively charged and discharged to produce the clock signal, and wherein the command means delay a discharging of the capacitor as a function of the state of the control signal.

5. A circuit according to claim 4, wherein the oscillator comprises comparison means to produce a pulse when a voltage produced at the capacitor terminal reaches a reference value, means controlled by the pulse to discharge the capacitor when the voltage produced at the capacitor terminal reaches the reference value, and a divider to produce the clock signal out of the pulses.

6. A circuit according to claim 5, wherein the comparison means comprise a comparator and a hysteresis inverter that are series-connected.

7. A method for generating a clock signal for a charge pump type of high voltage generator circuit, comprising steps of:

producing a clock signal;

repetitively producing piloting signals out of the clock signal; and issuing a command signal to the oscillator to generate a clock signal at a frequency equal to a smallest frequency of a first fixed frequency and a second frequency dependent on the piloting signals.

8. A method according to claim 7, wherein the step of issuing a command signal to the oscillator comprises a step of producing the second frequency by delaying the clock signal when the piloting signals are not at a maximum value.

* * * * *